(12) United States Patent
Pferdekaemper et al.

(10) Patent No.: US 7,457,933 B2
(45) Date of Patent: Nov. 25, 2008

(54) METHODS AND SYSTEMS FOR ARCHIVING DATA

(75) Inventors: Thorsten Pferdekaemper, Walldorf (DE); Martin Fischer, Heidelberg (DE)

(73) Assignee: SAP AG, Walldorf (DE)

( * ) Notice: Subject to any disclaimer, the term of this patent is extended or adjusted under 35 U.S.C. 154(b) by 329 days.

(21) Appl. No.: 10/526,504

(22) PCT Filed: Sep. 4, 2003

(86) PCT No.: PCT/EP03/09830

§ 371 (c)(1),
(2), (4) Date: Oct. 24, 2005

(87) PCT Pub. No.: WO2004/025503

PCT Pub. Date: Mar. 25, 2004

(65) Prior Publication Data

US 2006/0129768 A1    Jun. 15, 2006

Related U.S. Application Data

(60) Provisional application No. 60/408,903, filed on Sep. 9, 2002, provisional application No. 60/408,905, filed on Sep. 9, 2002, provisional application No. 60/408,901, filed on Sep. 9, 2002, provisional application No. 60/408,902, filed on Sep. 9, 2002, provisional application No. 60/409,606, filed on Sep. 11, 2002, provisional application No. 60/409,593, filed on Sep. 11, 2002.

(51) Int. Cl.
*G06F 12/06* (2006.01)

(52) U.S. Cl. ............................ 711/170; 711/156
(58) Field of Classification Search ............... 711/170, 711/156; 707/204, 200
See application file for complete search history.

(56) References Cited

U.S. PATENT DOCUMENTS 5,504,900 A    4/1996    Raz (Continued)

FOREIGN PATENT DOCUMENTS

EP    0 499 422 A2    8/1992

(Continued)

OTHER PUBLICATIONS

PCT Search Report mailed Mar. 30, 2004 for PCT/EP2003/09828.

(Continued)

*Primary Examiner*—Pierre-Michel Bataille
(74) *Attorney, Agent, or Firm*—Finnegan, Henderson, Farabow, Garrett & Dunner LLP

(57) ABSTRACT

Methods, computer readable medium, and systems are provided for moving data objects from a first storage location to a second storage location. A data object may be selected from the first storage location. A first type identifier (ID) and a second type ID may be assigned to the data object. The second type ID may be stored in a second lock object. The first type ID may be stored in a first lock object. The data object may then be stored at the second storage location. The data object may then be deleted from the first storage location. The second type ID may then be deleted from the second lock object.

38 Claims, 9 Drawing Sheets

U.S. PATENT DOCUMENTS

| | | | |
|---|---|---|---|
| 5,548,750 A * | 8/1996 | Larsson et al. | 707/204 |
| 5,557,792 A | 9/1996 | Josten et al. | |
| 5,566,319 A | 10/1996 | Lenz | |
| 5,761,660 A | 6/1998 | Josten et al. | |
| 5,835,906 A | 11/1998 | Hagersten et al. | |
| 5,913,213 A | 6/1999 | Wikstrom et al. | |
| 6,088,693 A | 7/2000 | Van Huben et al. | |
| 6,226,641 B1 | 5/2001 | Hickson et al. | |
| 6,269,382 B1 | 7/2001 | Cabrera et al. | |
| 6,324,581 B1 | 11/2001 | Xu et al. | |
| 6,334,134 B1 | 12/2001 | Haderle et al. | |
| 6,343,296 B1 | 1/2002 | Lakhamraju et al. | |
| 6,353,836 B1 | 3/2002 | Bamford et al. | |
| 6,405,274 B1 | 6/2002 | Chan | |
| 6,412,034 B1 | 6/2002 | Chan | |
| 6,507,853 B2 | 1/2003 | Bamford et al. | |
| 6,557,082 B1 | 4/2003 | Josten et al. | |
| 6,594,683 B1 | 7/2003 | Furlani et al. | |
| 6,651,123 B1 | 11/2003 | Hutchinson et al. | |
| 6,772,155 B1 | 8/2004 | Stegelmann | |
| 6,772,177 B2 | 8/2004 | Hsiao et al. | |
| 6,772,255 B2 | 8/2004 | Daynes | |
| 6,775,750 B2 | 8/2004 | Krueger | |
| 6,839,819 B2 | 1/2005 | Martin | |
| 6,850,938 B1 | 2/2005 | Sadjadi | |
| 6,944,615 B2 | 9/2005 | Teng et al. | |
| 6,950,834 B2 | 9/2005 | Huras et al. | |
| 6,952,707 B1 | 10/2005 | Josten | |
| 7,036,043 B2 | 4/2006 | Martin et al. | |
| 7,222,142 B2 | 5/2007 | Fischer et al. | |
| 7,251,661 B1 | 7/2007 | Reed et al. | |
| 2001/0056425 A1 | 12/2001 | Richard | |
| 2002/0087476 A1 | 7/2002 | Salas et al. | |
| 2003/0004945 A1 | 1/2003 | Teng et al. | |
| 2003/0004975 A1 * | 1/2003 | Nakano et al. | 707/200 |
| 2004/0059759 A1 * | 3/2004 | Doan et al. | |
| 2006/0101094 A1 | 5/2006 | Fischer et al. | |
| 2006/0129768 A1 | 6/2006 | Pferdekaemper et al. | |
| 2006/0149696 A1 | 7/2006 | Pferdekaemper et al. | |
| 2006/0149736 A1 | 7/2006 | Pferdekaemper et al. | |
| 2006/0155704 A1 | 7/2006 | Fischer et al. | |

FOREIGN PATENT DOCUMENTS

| | | |
|---|---|---|
| EP | 0 499 422 A3 | 8/1992 |
| EP | 1 283 477 A1 | 2/2003 |

OTHER PUBLICATIONS

Martin Fischer et al., U.S. Appl. No. 10/656,208, filed Sep. 8, 2003, entitled "Methods and Systems for Controlling Access to a Data Object."

Martin Fischer et al., U.S. Appl. No. 10/526,747, filed Nov. 14, 2005, entitled "Methods and Systems for Moving Data Objects."

Thorsten Pferdekaemper et al., U.S. Appl. No. 10/526,748, filed Nov. 8, 2005, entitled "Methods and Systems for Data Moving Using Locks."

Martin Fischer et al., U.S. Appl. No. 10/526,749, filed Nov. 14, 2005, entitled "Methods and Systems for Moving Data Using Locks."

Thorsten Pferdekaemper et al., U.S. Appl. No. 10/526,750, filed Nov. 14, 2005, entitled "Methods and Systems for Controlling Access to a Data Object by Means of Locks."

Thorsten Pferdekaemper et al., U.S. Appl. No. 10/526,751, filed Nov. 14, 2005, entitled "Electronic Data Structure for Controlling Access to Data Objects Using Locks."

R. Schaarschmidt et al., "Konzepte und Implementierungsaspekte anwendungsorientierten Archivierens in Datanbanksystemen," Computer Science, Research & Development, 1998, vol. 13, pp. 79-89.

Ralf Schaarschmidt et al., "Datenbankbasiertes Archivieren im SAP System R/3," WI—Essay, Sep. 1996.

Stefani, H. "Datenarchivienrung mit SAP", Galileo Pres GmbH, Bon 2002, ISBN 3-89842-212-7.

Tanebaum, A. S., "Modern Operating System", Prentice-Hall international, Inc., New jersey USA XP-002266518, ISBN: 0-13-595752-4, pp. 494-496, (1992).

Daugherty et al., "Multi-Axial Subassemblage Testing System (Mast) Data Collection and Telepresence Systems Specification," A Report from the National Science Foundation, George E. Brown, Jr. Network for Earthquake Engineering Simulation (NEES), Department of Civil Engineering, Institute of Technology, University of Minnesota, Jul. 15, 2002.

* cited by examiner

METHODS AND SYSTEMS FOR ARCHIVING DATA

This application is a national stage filing under 35 U.S.C. § 371 of International Application No. PCT/EP2003/009830, filed on Sep. 4, 2003, which published in the English language, and claims the benefit of priority to U.S. Provisional Application Nos. 60/408,901, filed on Sep. 9, 2002, 60/408,902, filed on Sep. 9, 2002, 60/408,903, filed on Sep. 9, 2002, 60/408,905, filed on Sep. 9, 2002, 60/409,606, filed on Sep. 11, 2002, and 60/409,593, filed on Sep. 11, 2002.

BACKGROUND OF THE INVENTION

1. Field of the Invention

The technical field of this invention is in the area of electronic data processing. More particularly, the invention relates to methods, computer program products and systems for data moving.

2. Description of the Related Art

Moving of data objects is well known to every user of a computer and is a standard procedure, which is routinely applied. A special application of moving data objects is the archiving process, by which data objects are moved from a first to a second storage location for safety and/or performance reasons. In enterprises, enterprise resource planning software (ERP) applications are used to control or support business processes and the management of the enterprise. ERP software is further used to manage company information of enterprises of various kinds in any field of technology by means of automatic data processing systems such as computers or computer systems. During the use of such software a huge amount of data is usually created, which contains important business information and which has to be archived from time to time.

According to the state of the art (see Helmut Stefani, Datenarchivierung mit SAP, Galileo Press GmbH, Bonn 2002, ISBN 3-89842-212-7), archiving can be performed automatically by archiving software tools, which can be part of the ERP software. Such tools can consist of a writing module, which stores (writes) the data objects to be archived sequentially in archive files, and a deleting module, which deletes the successfully archived data from the original data object base. The writing module can select the data objects to be archived from the data base according to specific criteria, e.g. the creation time of the data. It usually does not modify the original data objects or data base. The deleting module staggeredly reads the archive file sequentially and deletes the data objects found in the archive file from the original data base. This ensures that only such data objects are deleted from the original data base, which are readably stored in the archive file. The time for the archiving procedure as a whole depends on the amount of data and varies from a few milliseconds to several hours or days. Consequently, there is in many cases a considerable time gap between writing the data into the archive file and deleting the data from the original data base. This time gap can be a reason for the following problems:

As long as the data objects are still available in the original database, they can still be modified during the time gap. Because the deleting program does not compare the archived data object and the data object to be deleted, such modifications can be lost. This has not only the consequence of the loss of the amended data, it can additionally have the consequence that certain business processes can not be completed.

Another problem arises if several archiving processes run in parallel. In this scenario, that one data object can be archived several times, and no longer unambiguously identifiable. This can have the consequence that evaluations or statistical analysis, which use the archive files, produce wrong results.

It is also possible that data objects in the original database are read by the writing module and are simultaneously modified by another software application. In such a case, the data can be transferred from an archiveable status to a non-archiveable status. As a result, data objects which are not archiveable are written into the archive file and are deleted from the original database. In effect, this can result in a loss of data.

Thus, there is a need for a method and/or data processing system providing a more efficient solution of the problems described above.

SUMMARY OF THE INVENTION

In accordance with one embodiment of the invention, as embodied and broadly described herein, methods and systems consistent with the principles of the invention provide for moving data objects in a computer system from a first storage location to a second storage location, comprising:

selecting one or more data objects from the first storage location;

assigning an identifier (ID) of a first type to each of the selected data objects;

assigning an ID of a second type to each of the selected data objects;

storing the first type ID in a first lock object;

storing the second type ID in a second lock object;

storing a data object, the first ID of which is contained in the first lock object, at the second storage location;

deleting the data object, the first type ID of which is contained in the lock object, from the first storage location;

deleting the first type ID from the first lock object after the step of storing the second type ID in the second lock object the respective data object assigned to that at least one ID has been completed; and deleting a second type ID from the second lock object after the step of storing the first type ID for in the first lock object a particular first type ID has been completed.

By using this method, software applications, which require access to data objects, can check by querying the lock object, whether the data object to be accessed are subject to a moving process or not. If yes, the access to that data can be postponed until the moving is completed.

In accordance with another aspect of the invention, as embodied and broadly described herein, methods and systems consistent with the principles of the invention provide a computer system for processing data by means of or in a software application, comprising:

memory means for storing program instructions;

input means for entering data;

storage means for storing data;

a processor responsive to program; and program instructions adapted to carry out the method described above.

The invention and its embodiments are further directed to a computer readable medium and a carrier signal comprising instructions for processing data according to inventive method and in its embodiments.

One advantage of the invention and its embodiments is that the security against data loss in data moving and archiving procedures may be greatly improved. This may avoid spending a lot of time and/or money for data retrieval.

Additional objects and advantages of the invention and its embodiments will be set forth in part in the description, or can be learned by practice of the invention. Objects and advantages will be realized and attained by means of the elements and combinations particularly pointed out in the appended claims. Embodiments of the invention are disclosed in the detailed description section and in the dependent and appended claims as well.

It is understood that both the foregoing general description and the following detailed description are exemplary and explanatory only and are not restrictive of the invention and its embodiments, as claimed.

BRIEF DESCRIPTION OF THE DRAWINGS

The accompanying drawings, which are incorporated in and constitute a part of this specification, illustrate examples of embodiments of the invention and, together with the description, explain the principles of the invention. In the drawings.

DETAILED DESCRIPTION

Figure 1:
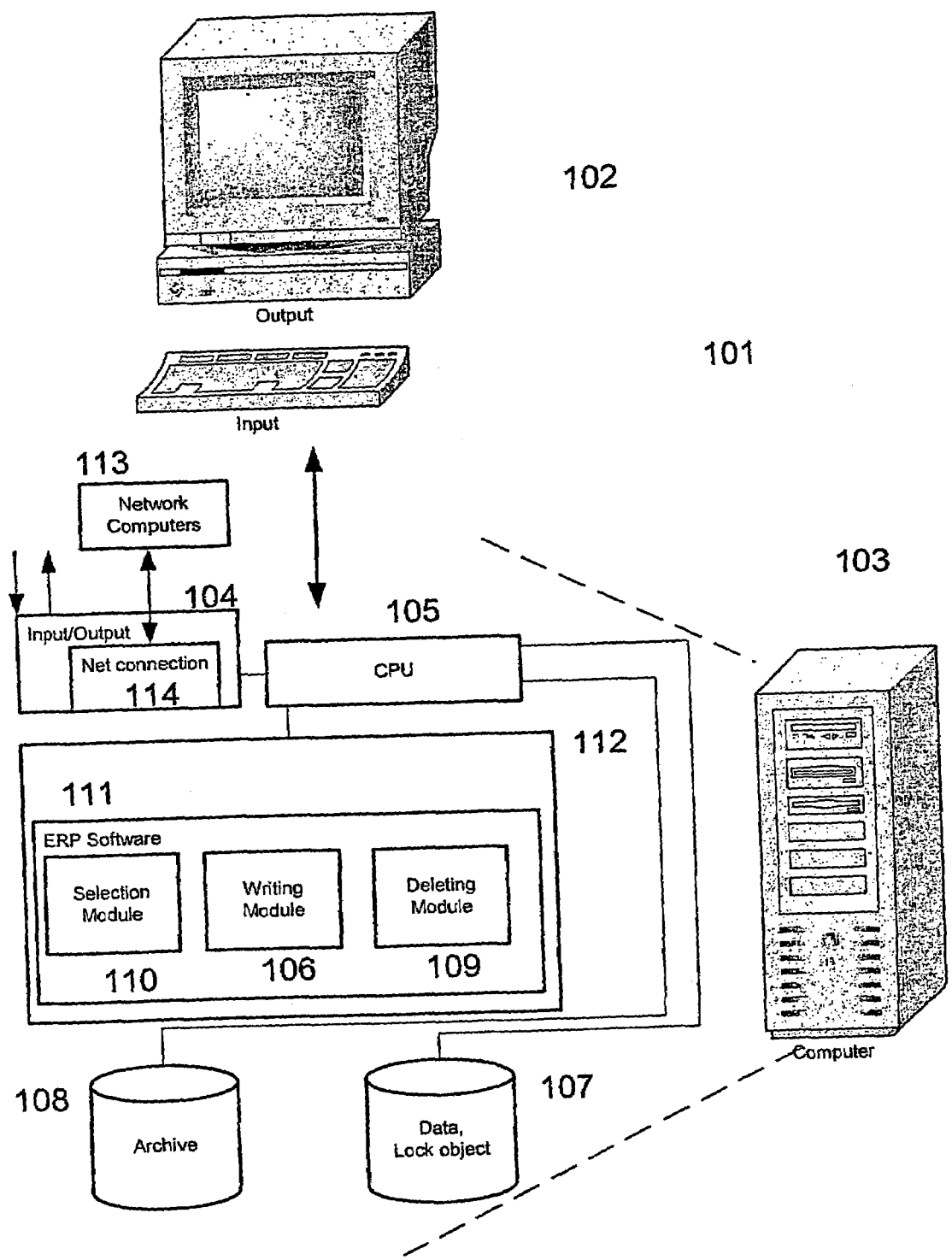
FIG. 1 is a schematic block diagram of an exemplary computer system for implementing methods consistent with the present invention.

Computer systems and programs are closely related. As used hereinafter, phrases, such as "the computer provides," "the program provides or performs specific actions," and "a user performs a specific action" are convenient abbreviations to express actions by a computer system that is controlled by a program or to express that the program or program module is designed to enable the computer system to perform the specific action or the enable a user to perform the specific action by means of a computer system.

Reference will now be made in detail to the principles of the invention by explaining the invention on the basis of the archiving process, examples of which are illustrated in the accompanying drawings. Examples, mentioned therein, are intended to explain the invention and not to limit the invention in any kind.

Within the concept of this description, the terms used shall have their usual meaning in the context of the field of data processing unless defined otherwise in the following section:

A computer system can be a stand alone computer such as a PC or a laptop or a series of computers connected as a network, e.g. a network within a company, or a series of computers connected via the internet. A data object to be archived can be any kind or type of data, e.g. numerical or textual data, image data, meta data, irrespective whether the data are implemented as whole files or parts of files or fields in tables, irrespective whether they are stored in volatile memory or nonvolatile memory. As an example, data objects according to the present invention can be implemented as one or more fields of one or more tables, particularly of tables of a relational data base system, or as objects in an object orientated programming language.

The term ERP software shall be considerer to comprise any software application that supports the business processes of an enterprise.

A storage location is volatile or nonvolatile storage means accessible by the computer system. It can be any kind of computer storage means known to one of ordinary skill, e.g. RAM, magnetical or optical storage, such as floppy disk, hard disk, MO-Disk, CD-ROM, CD RW, DVD ROM, DVD RW, etc. The first and second storage location can be identical. In this case, the archived data objects have to be stored at a place different to the place of the original data objects to be archived. The second storage location can also be implemented as a file, located anywhere in the accessible nonvolatile storage means. Such file is subsequently referred to as archive file.

An identifier (ID) is a type of data, which allows an unambiguous identification of the data object to be archived. It can be implemented, for example, as a number or a combination of alphanumerical characters or as a characteristic part of the data object to be archived. It is clear from that definition that a data object can have a wide variety of IDs. A lock object is a data object, in which the identifiers are stored. It can be implemented, e.g., as a file on a storage means or as a data array in computer memory. The first lock object is stored advantageously in a nonvolatile storage means. The second lock object is stored in volatile and/or nonvolatile storage means.

FIG. 1 is a schematic block diagram of an exemplary implementation of a computer system. FIG. 1 shows a computer system 101 comprising a computer 103 having a CPU 105, a working storage 112, in which an ERP software 111 is stored for processing by CPU 105. The second lock object is stored in working storage 112 as well. ERP software 111 comprises program modules 106, 109, 110 for carrying out the inventive data archiving process. Computer system 101 further comprises input means 113, output means 112 for interaction with a user, and general input/output means 104, including a net connection 114, for sending and receiving data. A plurality of computer systems 101 can be connected via the net connection 114 in the form of a network 113. In this case, the network computers 113 can be used as further input/output means, including the use as further storage locations. Computer system 103 further comprises a first storage means 107, in which data to be archived and the first lock object are stored, and a second storage means 108, in which the archived data are stored.

In case the program modules 106, 109, 110 are processed by CPU 105 in order to carry out the inventive process, one or more data objects stored in the first storage means 107 are selected by selection module 110. Selection module 110 assigns an ID to each of the selected data objects and stores the first type ID in the first lock object at the storage location 107 and the second type ID in the second lock object in the working storage 112. Writing module 106 reads the data objects and the lock object and stores such data objects, the ID of which are contained in the lock object to the second storage location 108. Deleting module 109 then reads the archived data objects in the second storage location 108 and deletes the data objects, which it could successfully read from the original set of data objects in the first storage location 107. After deleting a specific data object, to which an ID was assigned, that first type ID is deleted from the first lock object.

In an alternative embodiment, the lock object is created by the selection module and not by the writing module.

In an alternative embodiment, the lock object may be created by the selection module and not by the writing module.

In a second implementation of the invention, a data object to be archived may comprise one or more fields of one or more tables, and the ID of the respective object may comprise one or more key fields of that data object. This can best be seen from FIG. 2. In this instance, various sets of data objects are created in the form of two-dimensional data arrays, i.e., two tables (table 1 and table 2) having columns named field A to field X and field A to field Y, respectively, and a certain, unspecified number of lines. A field of the array or table is defined by the name of the column and the respective line. Such a field can contain data to be archived. It can alternatively contain a reference to a line of a further table. For example, in table 1 field X in line 2 contains a reference to line 3 in table 2. A data object 201.x to be archived comprises of fields of one line of the respective table. If one of the fields contains a reference to a line of an other table, fields of this referenced line belong to the data object, as well. In the example in FIG. 2, a data object 201.x to be archived comprises the fields of line 2 in table 1 and fields of line 3 in table 2.

An ID of such a data object can be implemented by the content of one or more so-called key fields, if the combination of these key fields is unique within the respective table. In the example, the fields of "field A" and "field B" can be used as key fields for table 1, whereas field A alone is key field in table 2. Within this example, assigning an ID to the data object means to use the content of the fields of columns field A and B of the respective lines as the ID for that particular line. In line with this assignment, the IDs for the data object 201.x to be archived are stored as a first type ID in a first type lock object 203 named permanent lock object in FIG. 2 and as a second type ID in a second type lock object 204 named transactional lock object. The permanent lock object may be implemented as a table having two columns, the first of which contains the first type ID 1. The second type ID, ID 2, can be implemented as a one-dimensional data array stored in the working memory of the computer system. However, it can be implemented as a file on a nonvolatile storage means, too. The first type ID, ID 1, is deleted after the selected data object has been deleted according to the inventive process, and the second type ID, ID 2, may be deleted immediately after the time as defined in step h). Alternatively, type ID 1 IDs can be deleted after all the selected data objects have been deleted according to step g). As can be seen, both ID types have identical content, the ID of the respective lines of the data to be archived. However, this is not a necessary condition. Different contents can be used for the different ID types. The permanent lock objects further contain a column by which a filename may be assigned to the ID of the data object, i.e. that data object to be archived. In the example, line 1 is archived in a file named 001, lines 2 and 3 in file 002, and line 4 in file 003.

The selection of the data object can be implemented by an automatic procedure, such as a simple query, that returns all lines having a certain field that satisfies a certain condition. For example, the procedure could return all lines in which the content of a date field pre-dates or post-dates a certain deadline. Selection can also be implemented by a user to whom a selection table is presented via a graphical user interface.

A further embodiment may comprise storing the second type ID in the second lock object immediately after assigning an ID of a second type to each of the selected data objects for the respective data object. Alternatively, the second type of ID of the selected data object is stored before storing the data object assigned to that ID is started.

A further embodiment may comprising storing the first type IDs of all selected data objects before storing the data object at the second storage location.

In a further embodiment the invention may comprise checking whether a first type ID for the data object has been stored in a lock object, and if the first type ID has been stored, not storing the data object, the first ID of which is contained in the first lock object, at the second storage location for that data object.

Additionally, the invention may comprise checking whether that data object is contained in the second storage location, and if the data object is contained, not storing the data object, the first ID of which is contained in the first lock object, at the second storage location for that data object.

Another embodiment may comprise checking by querying a first lock object.

Still another embodiment may comprise determining whether the data object, the first ID of which is contained in the first lock object, was stored successfully at the second storage location, and upon a successful storage, checking, whether the data object assigned to the respective first ID has been completely stored in the second storage location, and if the respective ID has not been completely stored, skipping the step of deleting the data object from the first storage location and the step of deleting the first type ID from the first lock object after the respective data object assigned to that at least one ID has been for that data object and deleting the first ID from the first lock object.

Embodiments of the invention are now described in more detail with reference to FIGS. 3 to 5, which are schematic flow diagrams of exemplary methods may be implemented by the selecting, writing and deleting modules, respectively, as shown in FIG. 1. Within the context of this description, and particularly with respect to FIGS. 3 to 9, a first type ID is called a P-lock (permanent) and a second type ID is called a T-lock (transactional). Therefore, setting a P- or T-lock for a selected object means to store an ID of that object in a respective lock object. The term "permanent" results from the property of the P-lock of existing permanently, as long as the data object is not yet deleted from its original storage location. The term "transactional" results from the property of the T-lock of existing only as long as a specific action (e.g., checking of archiveability) is performed on a selected data object or, in other words, of being deleted after the respective action has been performed.

Figure 3:
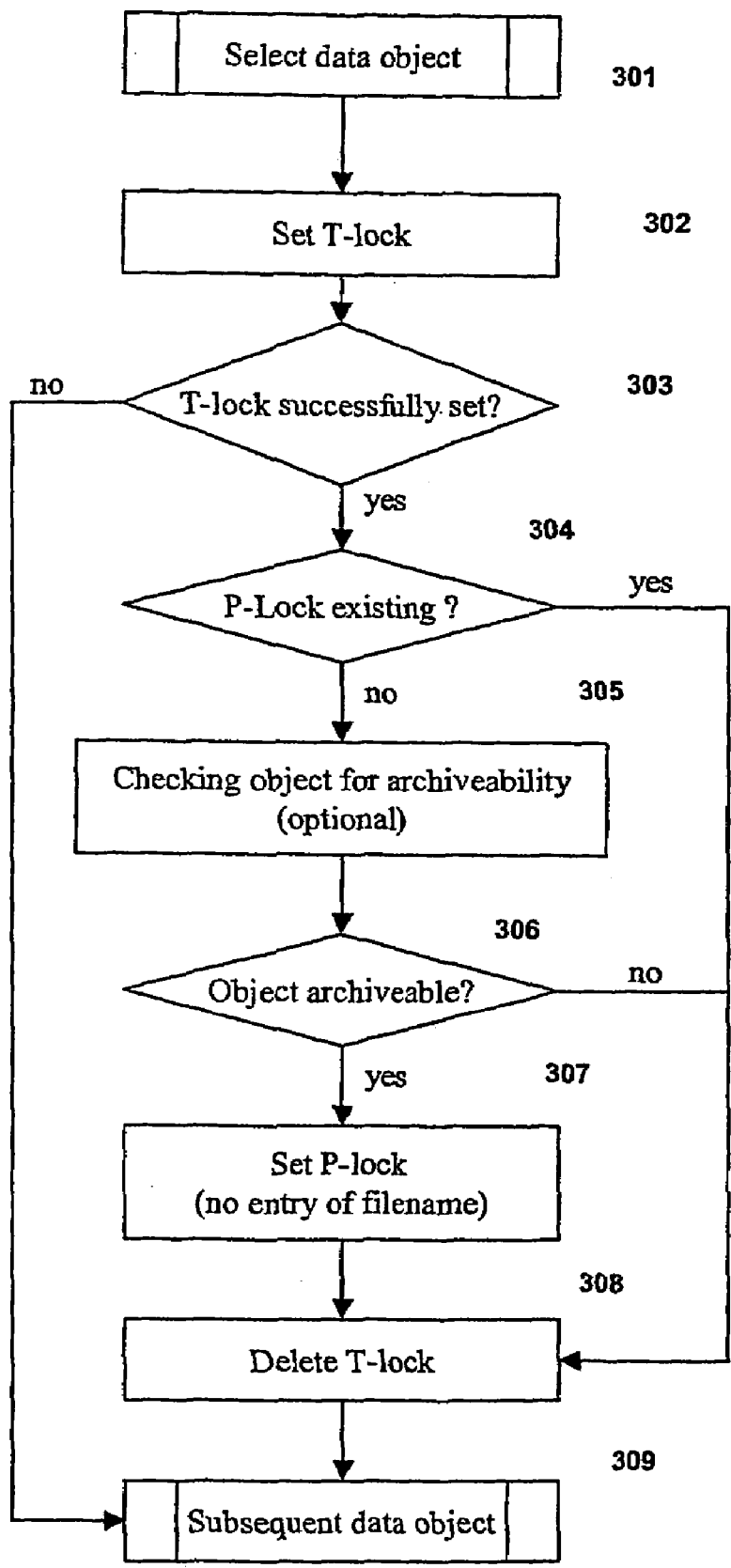
FIG. 3 is a flow diagram of an exemplary implementation of the selecting module shown in FIG. 1.

In the exemplary flow chart of the selecting module in FIG. 3, a data object is selected in a first step 301. Subsequently, a T-lock is set on this object in step 302. If the T-lock was successfully set (step 303), that is, if it did not yet exist, it is checked in step 304 whether a P-lock already exists in the selected data object. If the T-Lock could not be set successfully, the next data object is selected in step 309. The setting of the T-lock (step 302) and the check (step 303), whether it is successfully set, can advantageously be implemented as one "atomic" step. This means that both steps can be executed essentially at the same time or, in other words, the time gap between both steps can be essentially zero.

Both checks (steps 303 and 304) can also be implemented by querying the respective lock objects. If a P-lock exists, the T-lock is deleted (step 308) and the next data object is selected (step 309). If no P-lock exists, it is checked in steps 305 and 306 whether the data object is archiveable. Such checking comprises a test whether the data in the data object is readable, complete not being fraught with obvious failures etc. If the test was successful, a P-lock is set on that data object in step 307, whereby no archive file is assigned to the data object. Then the T-lock is deleted (step 308) and the next data object can be selected (step 309).

Figure 2:
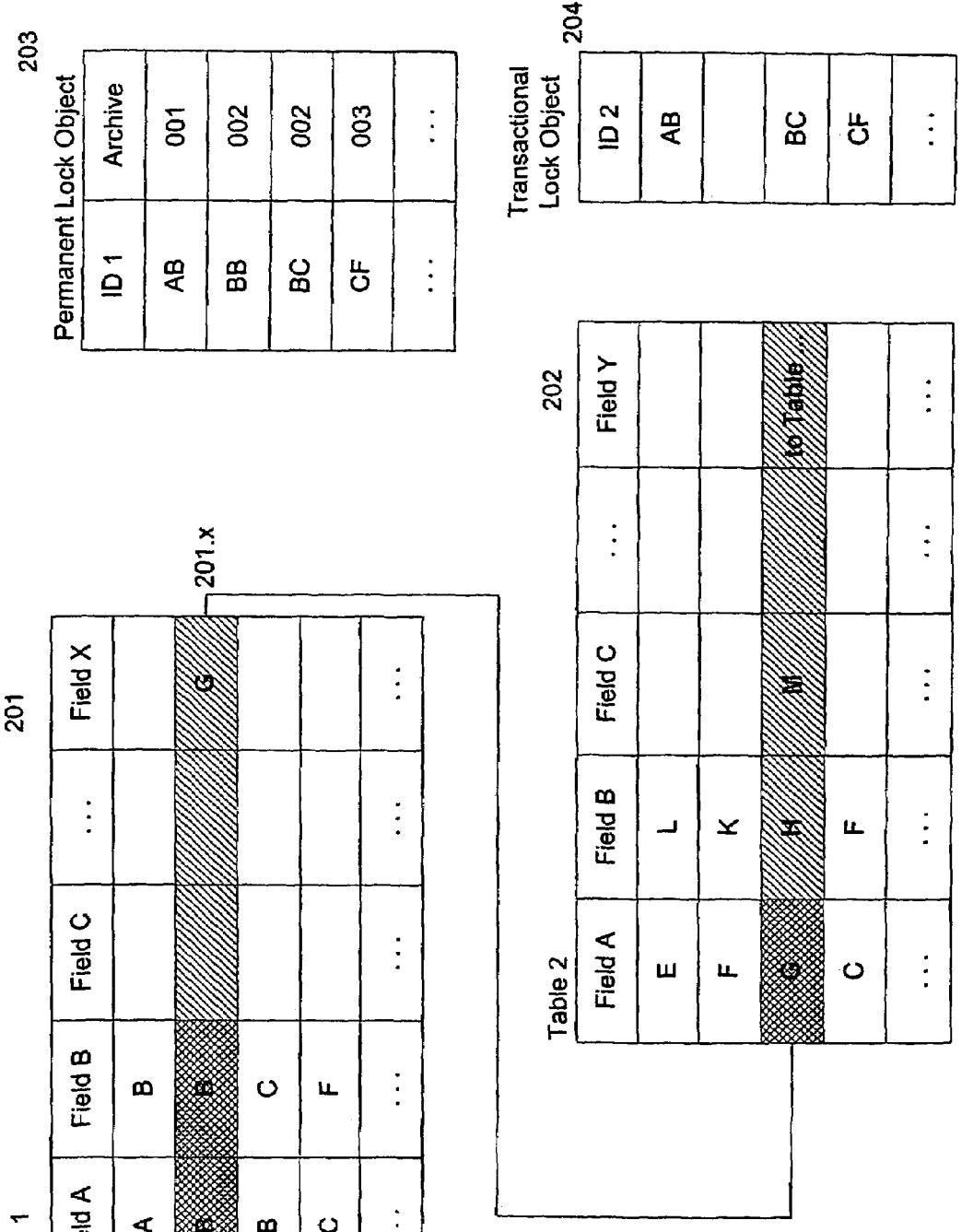
FIG. 2 is a schematic diagram of an exemplary structure of a data object in accordance with the principles of the inventive method.
Figure 4:
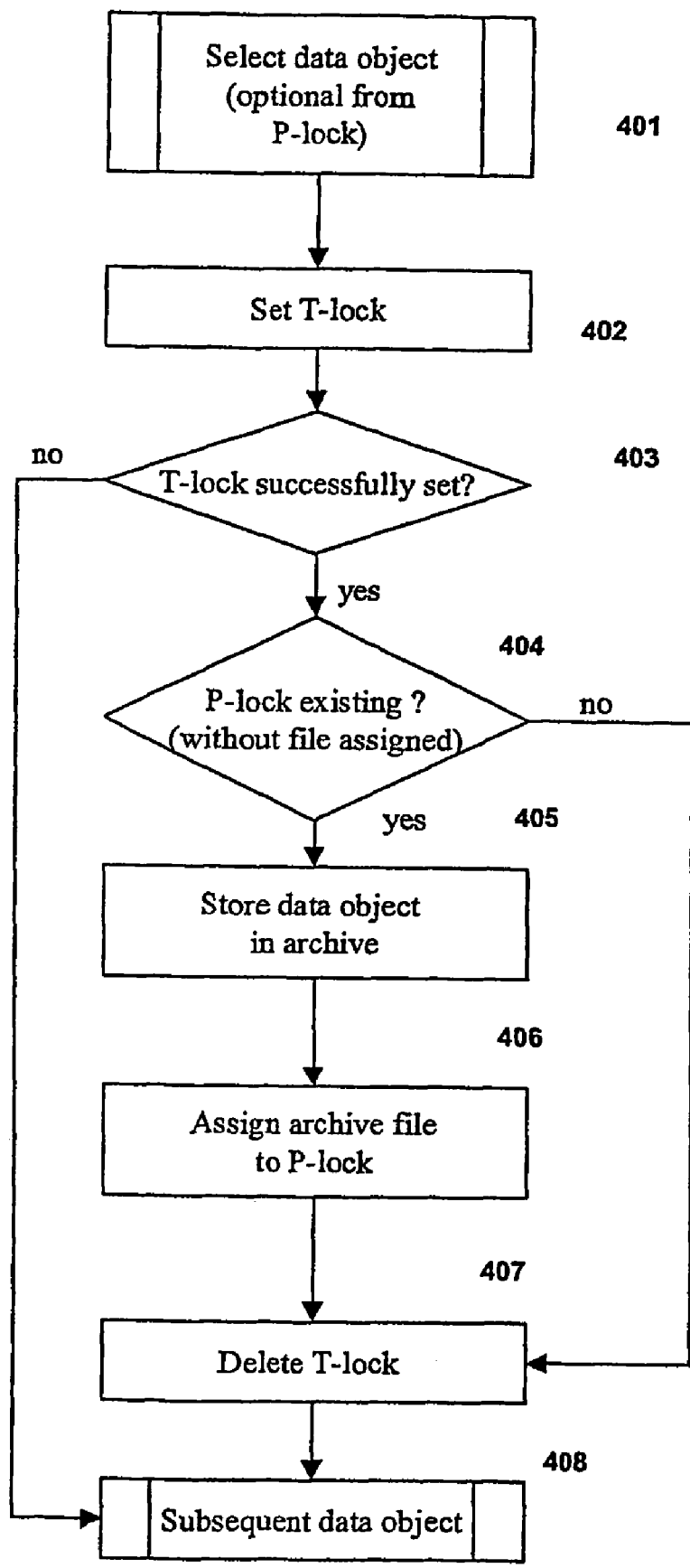
FIG. 4 is a flow diagram of an exemplary method for implementing the writing module shown in FIG. 1.

In the exemplary flow chart of the writing module in FIG. 4, a data object is selected in a first step 401. Subsequently, a T-lock is set on this object in (step 402). If the T-lock was successfully set (step 403), it is checked in step 404 whether a P-lock already exists in the selected data object, whereby no file must be assigned to that data object. If the condition is not fulfilled, the T-lock is deleted in step 407, and the next data object is selected in step 408. If a P-lock exists, the data object is stored in an archive file in step 405 and the archive file is assigned to the data object in step 406, e.g. by adding the file name to the lock object as shown in FIG. 2. Subsequently, the T-lock is deleted (step 407), and the next data object is selected (step 408).

Figure 5:
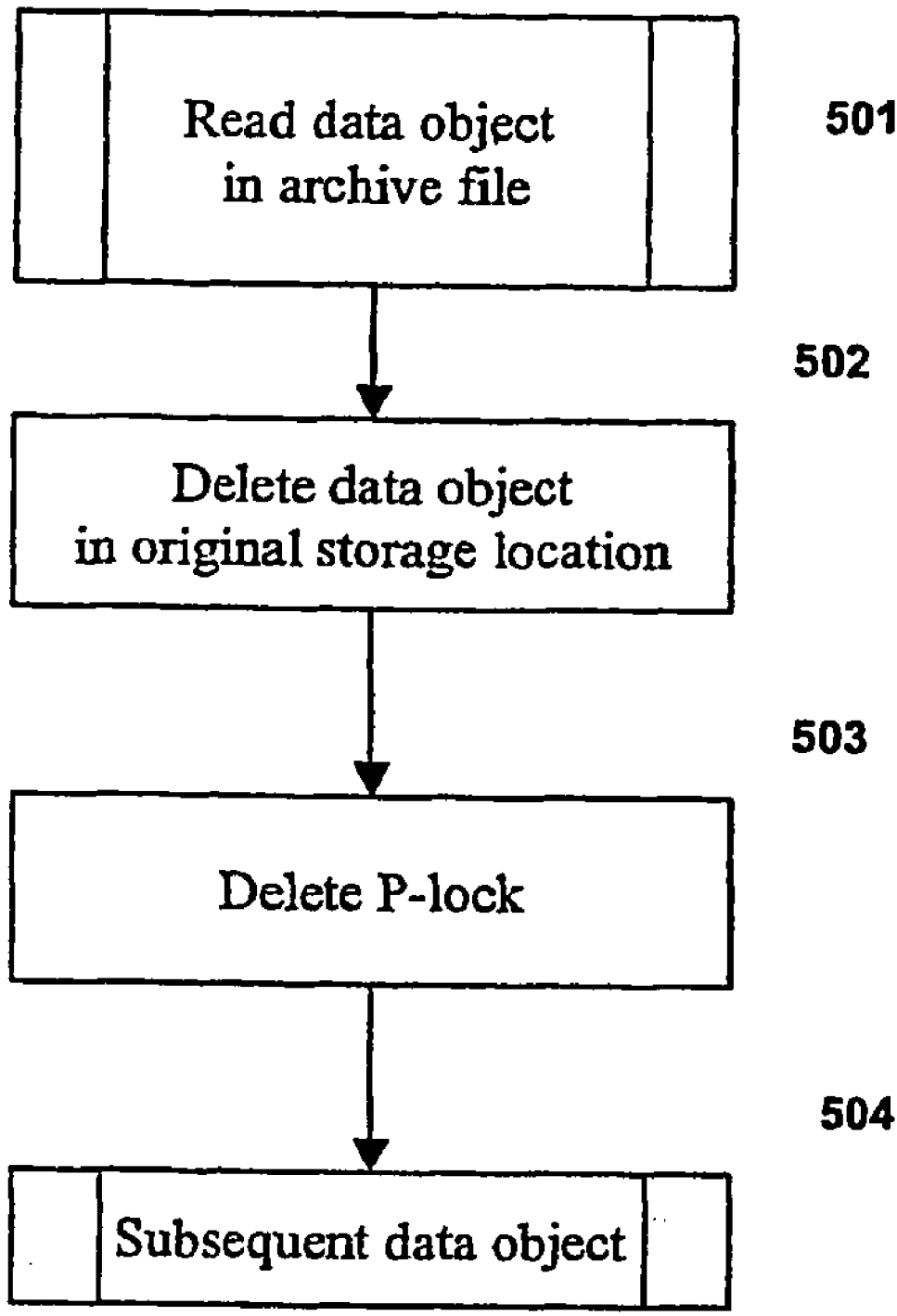
FIG. 5 is a flow diagram of an exemplary method for implementing the deleting module shown in FIG. 1.

In the exemplary flow chart of the deleting module in FIG. 5, a data object, that has already been archived is selected (step 501). This can be implemented by checking the archive files. If a data object has been selected and successfully read from the archive file, that data object is deleted from the original storage location (step 502), the P-lock is deleted (step 503), and the next data object is selected (step 504).

Figure 6:
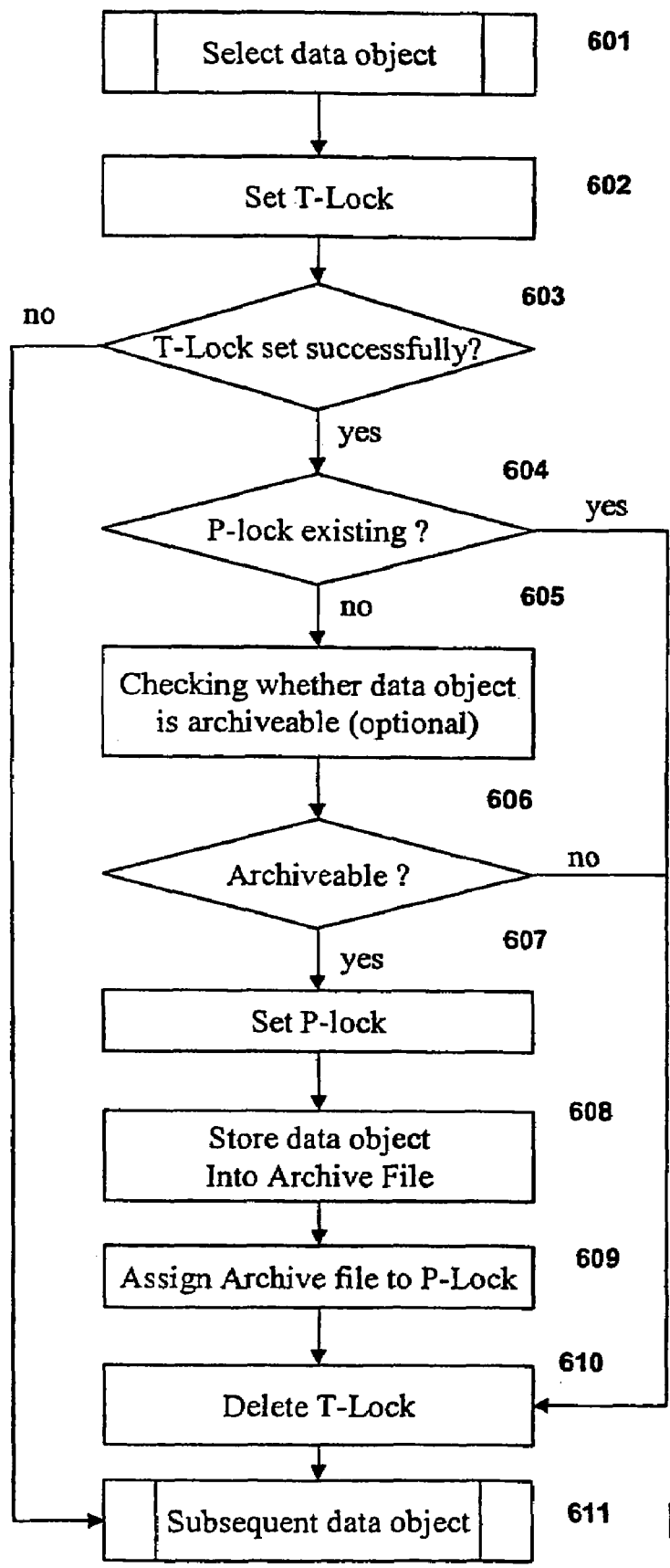
FIG. 6 is a flow chart of an exemplary method for implementing the selection and writing module shown in FIG. 1.

In the exemplary flow chart of a further exemplary implementation in FIG. 6, the selecting and writing module described above are combined to one module. Accordingly, a data object is selected in a first step 601. Subsequently, a T-lock is set on this object in step 602. If the T-lock was successfully set step 603, it is checked in step 604 whether a P-lock already exists in the selected data object. If the T-lock could not be set successfully, the next data object is selected (step 611). If a P-lock exists on that object, the T-lock is deleted in (step 610) and the next data object is selected (step 611). If no P-lock exists on that object, it is checked in (step 605) whether the data object is archiveable. If this check fails (step 606), the T-lock is deleted (step 610) and the next data object is selected (step 611). If the check 606 is positive, a P-lock is set (step 607), the data object is stored (step 608) in an archive file, the archive file is assigned to the P-lock (609), the T-lock is deleted (step 610), and the next data object is selected (step 611).

Figure 7:
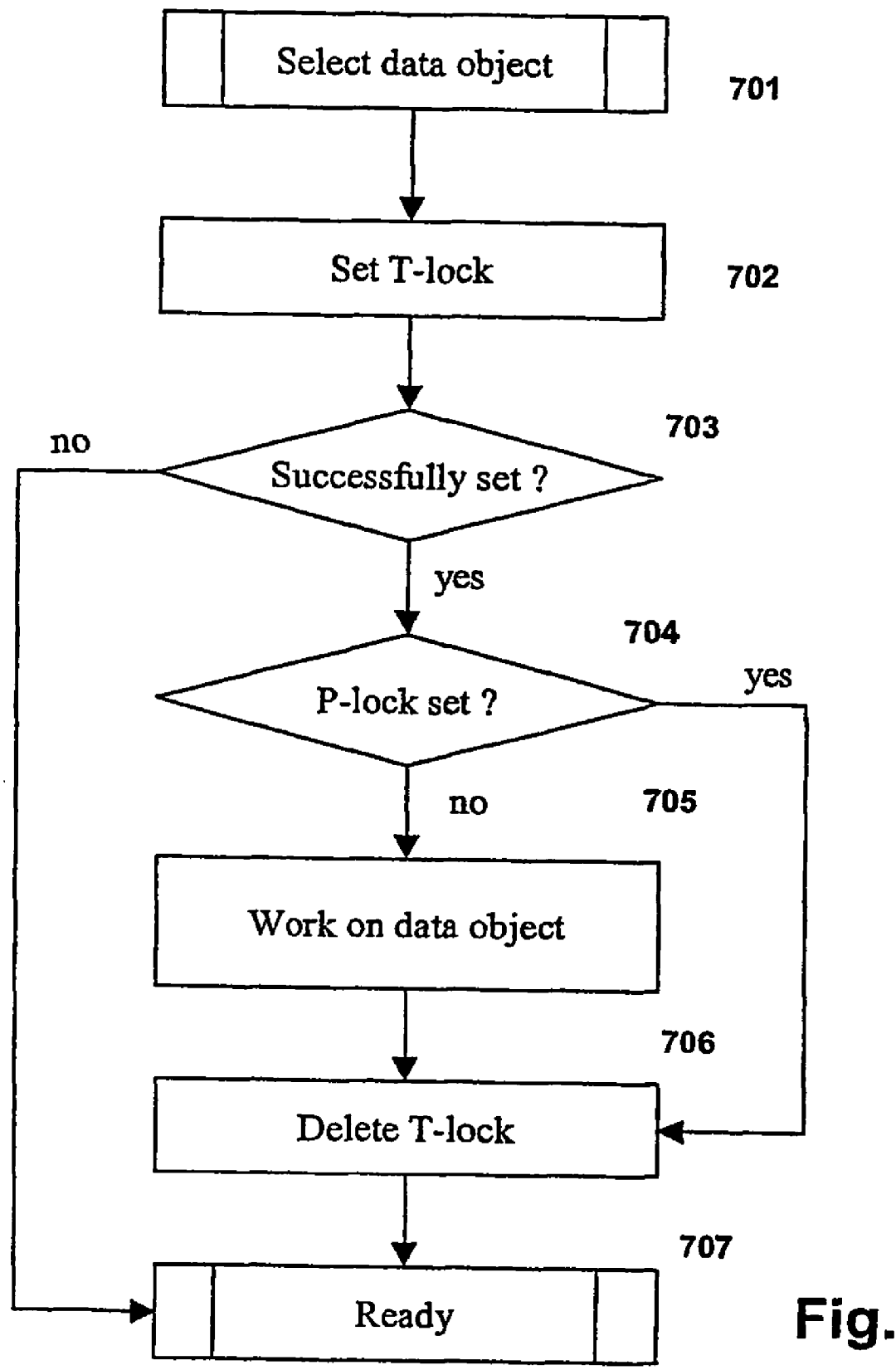
FIG. 7 is a flow chart of an exemplary method to demonstrate how any software application may use the concept of the P and T-locks.

FIG. 7 shows a flow chart of an exemplary method to demonstrate how any software application can use the concept of the P and T-locks to ensure that the measures, that the software application is going to apply on the data object, do not influence the archiving process. A software application which is programmed to have a read and/or write access to data objects, which can be subject of an archiving process as described, may comprise the following steps as shown in FIG. 7. In a first step 701, the data object is selected. Then, a T-lock is set in step 702 on that object by the application. If the T-lock is successfully set (step 703), it is checked in step 704, whether a P-lock exists on that object; otherwise the application terminates in (step 707). If a P-lock exists on that object, the T-lock is deleted (step 706), and the application terminates (step 707). If no P-lock exists, i.e., the data object is not subject to an archiving process, the application can have read/write access to the data object in a working step 705. Subsequently, the application deletes the T-lock (step 706) and terminates (step 707).

Figure 8:
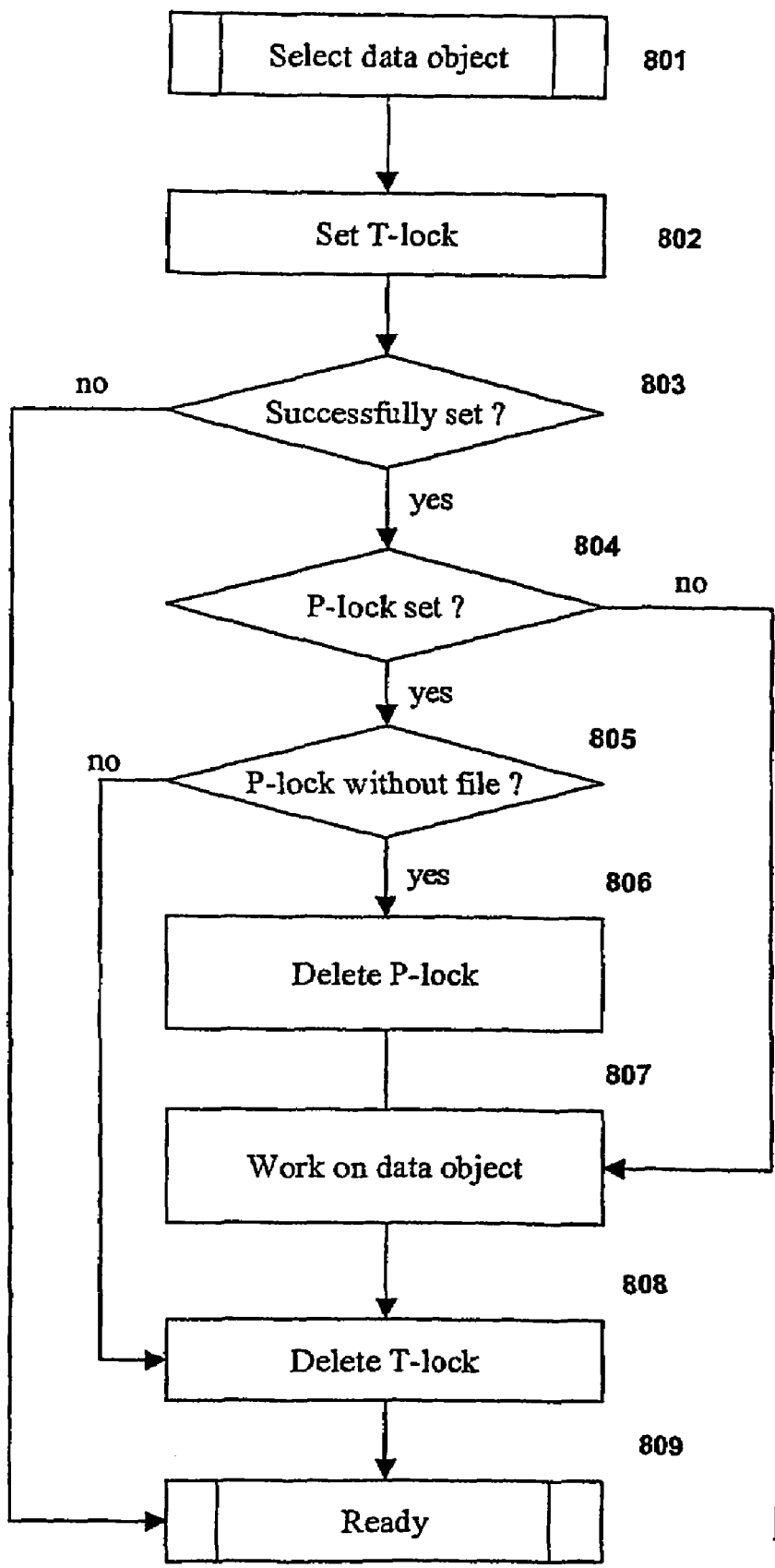
FIG. 8 is a flow chart of an exemplary method to demonstrate how any software application may use the concept of the P and T-locks, including a conditional deletion of a P-lock.

FIG. 8 is a flowchart of another exemplary method to demonstrate how any software application may use the concept of the P and T-locks, including a conditional deletion of a P-lock. In a first step 801, the data object is selected. Then, a T-lock is set on that object by the application (step 802). If the T-lock is successfully set (step 803), it is checked (step 804) whether a P-lock exists on that object; otherwise the application terminates (step 809). If no P-lock exists (step 804), i.e., the data object is not subject to an archiving process, the application can have read/write access to the data object in working step (step 807). Subsequently, the application deletes (step 808) the T-lock and terminates (step 809). If a P-Lock exists (step 804), it is checked (step 805) whether a file is assigned to it. If a file is assigned, the application deletes the T-lock (step 808) and terminates (step 809). If no file is assigned, the P-lock is deleted (step 806), and the application can have read/write access 807 to the data object. Subsequently, the application deletes the T-lock (step 808) and terminates (step 809).

Figure 9:
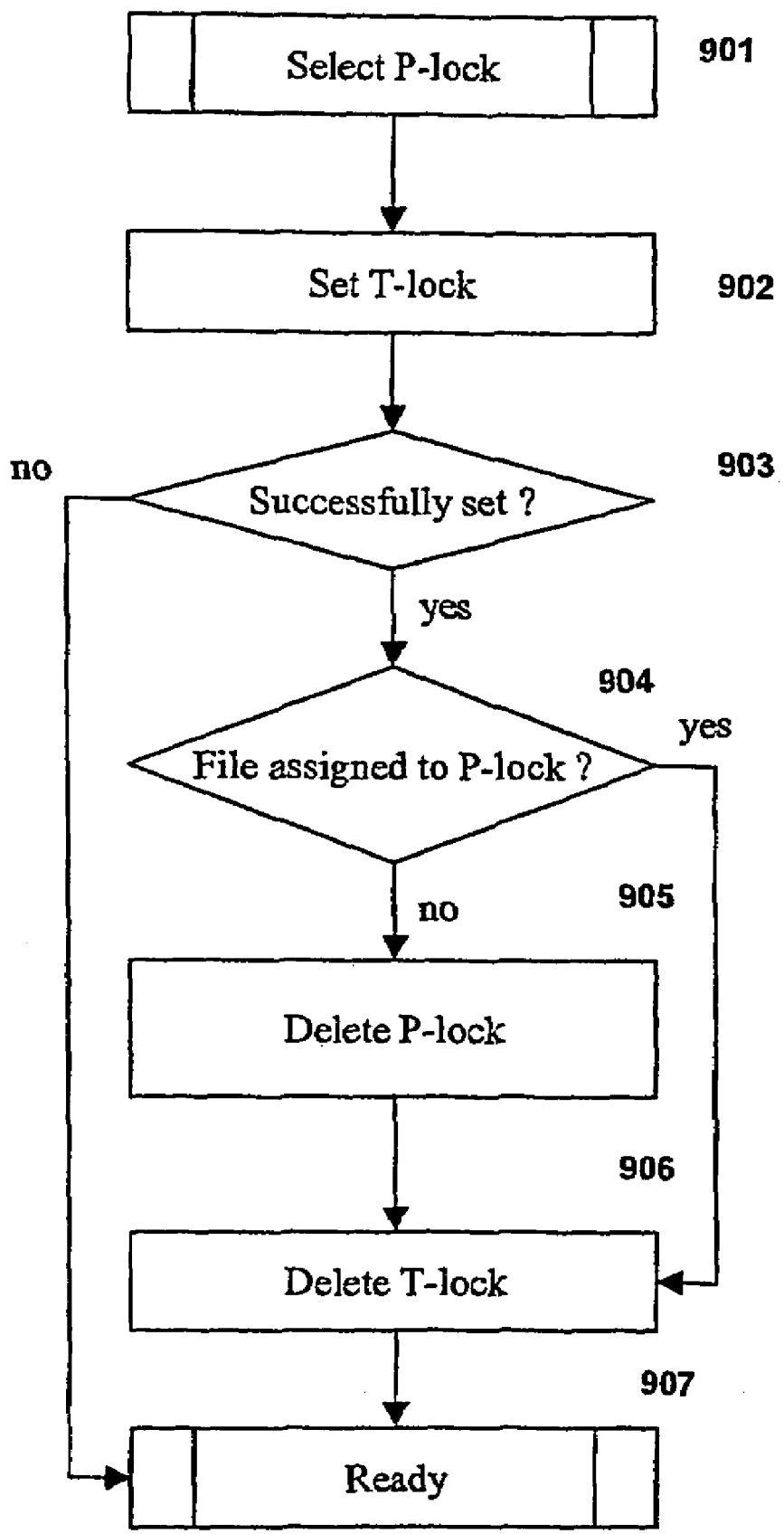
FIG. 9 is a flow chart for an exemplary method for implementation by a software module through which the locks can be deleted.

FIG. 9 is a flow chart of an exemplary method for implementation by a software module through which the locks set by the modules described above can be deleted. This can be useful in cases in which no archive files are assigned to P-locks or in which P-locks have been deleted for a user.

Therein, a P-lock is nothing else than a data object and can be treated in the same way as described above. In a first step 901, a P-lock is selected. Then, a T-lock is set to the P-lock in step 902. If the T-lock is successfully set (step 903), it is checked in (step 904), whether the P-lock has a file assigned. If the T-lock is not set successfully the module terminates (step 907). If the selected P-lock has no file assigned (step 904), the P-lock is deleted (step 905). Then, the T-lock is deleted (step 906) and the module terminates (step 907). Alternative to the termination (step 907), a next P-lock can be selected.

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed. Modifications and variations are possible in light of the above teachings or can be acquired from the practicing of the invention. For example, the described implementation includes software, but systems and methods consistent with the present invention can be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM. It is intended that the specification and examples be considered as exemplary only, with a true scope and spirit of the invention being indicated by the following claims.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of ® Java, C++, HTML, XML, or HTML with included Java applets or in SAP R/3 or ABAP.

What is claimed is:

1. A computer system for processing data, comprising:
   memory means for storing program instructions;
   input means for entering data;
   storage means for storing data;
   a processor responsive to the program instructions, wherein the program instructions comprise program code means for performing a method for moving data objects in the computer system from a first storage location to a second storage location, the method comprising:

selecting a data object from the first storage location;
assigning a first type identifier (ID) to the data object;
assigning a second type ID to the data object;
storing the second type ID in a second lock object, indicating that the data object is being accessed;
determining whether the second type ID was stored successfully in the second lock object, and upon a successful storage, storing the first type ID in a first lock object, indicating that the data object is being moved;
storing the data object at the second storage location;
deleting the data object from the first storage location; and
deleting the second type ID from the second lock object, indicating that the data object is no longer being accessed, after the first type ID has been stored in the first lock object.

2. A computerized system for processing data, the computerized system executing a method comprising:

selecting a data object from a first storage location;
assigning a first type identifier (ID) to the data object;
assigning a second type ID to the data object;
storing the second type ID in a second lock object, indicating that the data object is being accessed;
determining whether the second type ID was stored successfully in the second lock object, and upon a successful storage, storing the first type ID in a first lock object, indicating that the data object is being moved;
storing the data object at a second storage location;
deleting the data object from the first storage location; and
deleting the second type ID from the second lock object, indicating that the data object is no longer being accessed, after the first type ID has been stored in the first lock object.

3. The computerized system of claim 2, the method further comprising:

deleting the first type ID from the first lock object, indicating that the data object is no longer being moved, after the data object has been deleted from the first storage location.

4. The computerized system of claim 2, wherein the data object comprises one or more fields of one or more tables, and wherein the first type ID and the second type ID comprise one or more key fields of the one or more tables.

5. The computerized system of claim 2, wherein the data object is stored in a file and wherein an assignment of the first type ID to the file or to a name of the file is stored in the first lock object.

6. The computerized system of claim 2, wherein the first lock object is stored on a nonvolatile storage means.

7. The computerized system of claim 2, wherein the second type ID is stored in the second lock object after assigning the second type ID to the data object.

8. The computerized system of claim 2, wherein the second type ID is stored in the second lock object before the data object is stored at the second storage location.

9. The computerized system of claim 2, wherein storing the first type ID in the first lock object further comprises:

storing first type IDs of all selected data objects before storing the data object at the second storage location.

10. The computerized system of claim 2, the method further comprising:

checking whether the first type ID has been stored in the first lock object, and if the first type ID has been stored, skipping storing the data object at the second storage location.

11. The computerized system of claim 2, the method further comprising:

checking whether the data object is contained in the second storage location, and if the data object is contained in the second storage location, skipping storing the data object at the second storage location.

12. The computerized system of claim 11, wherein the checking is performed by querying the first lock object.

13. The computerized system of claim 2, the method further comprising:

checking whether the data object has been completely stored in the second storage location, and if not completely stored, skipping deleting the data object from the first storage location and deleting the second type ID from the second lock object, and deleting the first type ID from the first lock object.

14. A method for moving data objects in a computer system from a first storage location to a second storage location, comprising:

selecting a data object from the first storage location;
assigning a first type identifier (ID) to the data object;
assigning a second type ID to the data object;
storing the second type ID in a second lock object, indicating that the data object is being accessed;
determining whether the second type ID was stored successfully in the second lock object, and upon a successful storage, storing the first type ID in a first lock object, indicating that the data object is being moved;
storing the data object at the second storage location;
deleting the data object from the first storage location; and
deleting the second type ID from the second lock object, indicating that the data object is no longer being accessed, after the first type ID has been stored in the first lock object.

15. The method of claim 14, further comprising:

deleting the first type ID from the first lock object, indicating that the data object is no longer being moved, after the data object has been deleted from the first storage location.

16. The method of claim 14, wherein the data object comprises one or more fields of one or more tables, and wherein the first type ID and the second type ID comprise one or more key fields of the one or more tables.

17. The method of claim 14, wherein the data object is stored in a file and wherein an assignment of the first type ID to the file or to a name of the file is stored in the first lock object.

18. The method of claim 14, wherein the first lock object is stored on a nonvolatile storage means.

19. The method of claim 14, wherein the second type ID is stored in the second lock object after assigning the second type ID to the data object.

20. The method of claim 14, wherein the second type ID is stored in the second lock object before the data object is stored at the second storage location.

21. The method of claim 14, wherein storing the first type ID in the first lock object further comprises:

storing first type IDs of all selected data objects before storing the data object at the second storage location.

22. The method of claim 14, further comprising:
checking whether the first type ID has been stored in the first lock object, and if the first type ID has been stored, skipping at least storing the data object at the second storage location.

23. The method of claim 14, further comprising:
checking whether the data object is contained in the second storage location, and if the data object is contained in the second storage location, skipping at least storing the data object at the second storage location.

24. The method of claim 23, wherein checking whether the data object is contained in the second storage location is performed by querying the first lock object.

25. The method of claim 14, further comprising:
checking whether the data object has been completely stored in the second storage location, and if not completely stored, skipping at least deleting the data object from the first storage location and deleting the second type ID from the second lock object, and deleting the first type ID from the first lock object.

26. The method of claim 14 for use in an enterprise resource planning software.

27. A computer readable storage medium comprising instructions for performing a method for moving data objects in a computer system from a first storage location to a second storage location, the method comprising:
selecting a data object from the first storage location;
assigning a first type identifier (ID) to the data object;
assigning a second type ID to the data object;
storing the second type ID in a second lock object, indicating that the data object is being accessed;
determining whether the second type ID was stored successfully in the second lock object, and upon a successful storage, storing the first type ID in a first lock object, indicating that the data object is being moved;
storing the data object at the second storage location;
deleting the data object from the first storage location; and
deleting the second type ID from the second lock object, indicating that the data object is no longer being accessed, after the first type ID has been stored in the first lock object.

28. The computer readable storage medium of claim 27, the method further comprising:
deleting the first type ID from the first lock object, indicating that the data object is no longer being move, after the data object has been deleted from the first storage location.

29. The computer readable storage medium of claim 27, wherein the data object comprises one or more fields of one or more tables, and wherein the first type ID and the second type ID comprise one or more key fields of the one or more tables.

30. The computer readable storage medium of claim 27, wherein the data object is stored in a file and wherein an assignment of the first type ID to the file or to a name of the file is stored in the first lock object.

31. The computer readable storage medium of claim 27, wherein the first lock object is stored on a nonvolatile storage means.

32. The computer readable storage medium of claim 27, wherein the second type ID is stored in the second lock object after assigning the second type ID to the data object.

33. The computer readable storage medium of claim 27, wherein the second type ID is stored in the second lock object before the data object is stored at the second storage location.

34. The computer readable storage medium of claim 27, wherein storing the first type ID in the first lock object further comprises:
storing first type IDs of all selected data objects before storing the data object at the second storage location.

35. The computer readable storage medium of claim 27, the method further comprising:
checking whether the first type ID has been stored in the first lock object, and if the first type ID has been stored, skipping storing the data object at the second storage location.

36. The computer readable storage medium of claim 27, the method further comprising:
checking whether the data object is contained in the second storage location, and if the data object is contained in the second storage location, skipping storing the data object at the second storage location.

37. The computer readable storage medium of claim 36, wherein the checking is performed by querying the first lock object.

38. The computer readable storage medium of claim 27, the method further comprising:
checking whether the data object has been completely stored in the second storage location, and if not completely stored, skipping deleting the data object from the first storage location and deleting the second type ID from the second lock object, and deleting the first type ID from the first lock object.

* * * * *